United States Patent Office 2,988,885
Patented June 20, 1961

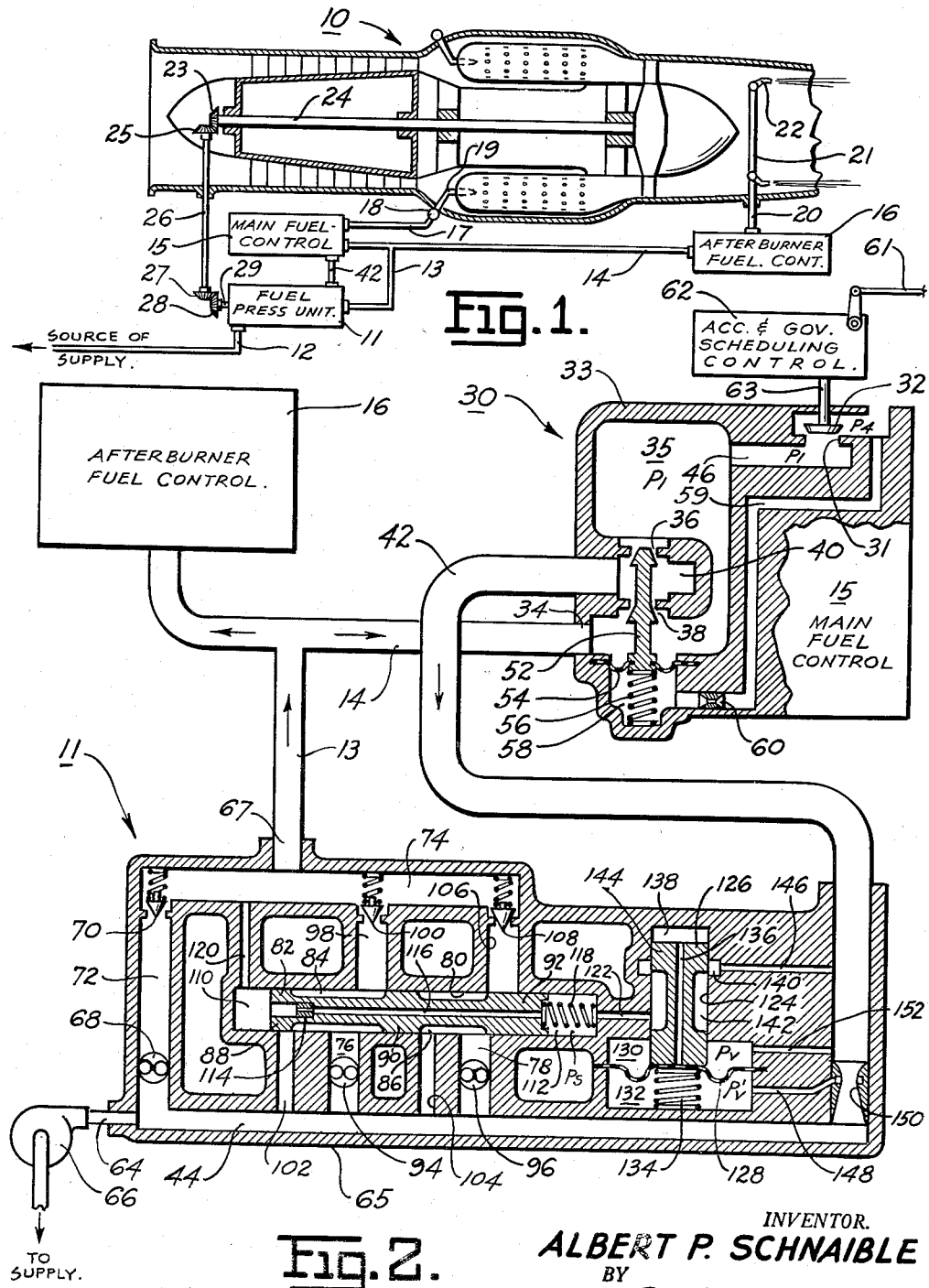

2,988,885
PUMP CONTROL
Albert P. Schnaible, South Bend, Ind., assignor to The Bendix Corporation, a corporation of Delaware
Filed Apr. 6, 1956, Ser. No. 576,710
5 Claims. (Cl. 60—39.28)

This invention relates to fluid pressurizing systems and in particular to a fuel pressurizing system having a multiple element pumping unit of the continuously operating type.

An object of this invention is to provide a self-unloading fluid pressurizing system.

Another object of this invention is to provide engine driven fluid pressurizing apparatus which requires a minimum amount of engine power for the actuation thereof at any given output condition.

Another important object of this invention is to provide a simple, compact and reliable fluid pressurizing system especially adapted for use with aircraft type engines.

A further object of this invention is to provide a fluid pressurizing system having a continuously operating gear type multiple element pumping unit in which the moving parts are subjected to a minimum amount of wear.

An important object of this invention is to provide a multiple element fluid pumping unit which contains automatic emergency transfer means operable in an event of a pump element failure.

Still another important object of this invention is to provide a fuel pump unloading means whereby a minimum amount of heat energy is imparted to the fuel by the action of the fuel pump in pressurizing the fuel.

A still further object of this invention is to provide a unified fuel pressurizing apparatus which may be quickly and easily replaced in a fuel system.

Other objects and advantages of the invention will be apparent during the course of the following description, in which:

FIGURE 1 is a diagrammatic representation of a main fuel system and an afterburner system for a jet engine incorporating the device of the invention; and FIGURE 2 is a schematic diagram of the present invention.

Referring to FIGURE 1 of the drawings, the reference numeral 10 designates a jet engine with which the fuel pressurizing apparatus 11 is associated, for delivering pressurized fuel to the main fuel system and the afterburner system. A conduit 12 connects the fuel pressurizing apparatus 11 to a fuel supply source, not shown. A conduit 13 connects the outlet of said fuel pressurizing apparatus with conduit 14 which communicates with the inlet of a main fuel control 15 and the inlet of an afterburner fuel control 16. A conduit 17 connects the outlet of the main fuel control 15 with a main fuel system manifold 18 and burner nozzles 19 and a conduit 20 connects the outlet of the afterburner fuel control to an afterburner fuel system manifold 21 and nozzles 22. The fluid pressurizing apparatus is adapted to be engine driven through a driving gear 23 connected to a shaft 24 which rotates according to engine speed and a driven gear 25 which is connected to the fluid pressurizing apparatus through a shaft 26, gears 27 and 28 and a shaft 29.

Referring to FIGURE 2, the main fuel control 15 includes a by-pass valve unit indicated by numeral 30 and shown in sectional schematic. The by-pass valve unit functions to maintain a constant $P_1-P_4$ pressure drop across a main fuel metering restriction 31, the effective area of which is determined by a main metering valve 32. The casing 33 is provided with an inlet 34 through which fuel is received from the fuel pressurizing unit 11 at a pressure $P_1$ into chamber 35. The total flow of fluid into chamber 35 is divided into two flow paths, one of which returns, by way of by-pass ports 36 and 38 and a by-pass chamber 40, a portion of the fluid to conduit 42 which communicates with the inlet of a plurality of gear type fuel pumps through a conduit or suction manifold 44. The other flow path conducts the remainder of the fuel to conduit 17 through fuel metering valve 32 of main fuel control 15 by way of conduit 46. The by-pass ports 36 and 38 are controlled by a double-landed poppet valve 52 which has one end secured to a diaphragm 54. The diaphragm 54 senses the pressure drop across the main fuel control metering valve 32. The outer edge of diaphragm 54 is securely attached to casing 33 and a spring 56 is interposed between poppet valve 52 and casing 33. A variable volume chamber 58 receives fuel at discharge pressure $P_4$ from conduit 46 through passage 59 which contains a restriction 60.

An engine all-speed governor control responsive to engine speed and the position of pilot controlled lever 61, and an acceleration fuel scheduling control responsive to engine speed and compressor inlet temperature, are shown in diagrammatic form at 62, said governor and acceleration controls being arranged in mutually overriding relation such that that one which allows the least quantity of fuel to flow through main metering restriction 31 controls the position of valve 32 in the restriction. The control 62 is connected to the metering valve by a rod 63.

For a detailed description of the remaining part of the main fuel control 15 with which the by-pass valve unit 30 is associated, see copending application Serial No. 501,346 filed April 14, 1955, in the name of Howard J. Williams (common assignee).

The reference numeral 65 refers to a casing having an inlet port 64 which communicates conduit or suction manifold 44 with the discharge side of an engine driven centrifugal boost pump 66 and an outlet port 67 which communicates with conduit 13. The boost pump 66 has an approximate capacity of 50,000 lbs./hr. and is adapted to deliver fuel from a supply tank, not shown, to the conduit or suction manifold 44. A gear type fluid pump 68 having a capacity of approximately 8,000 lbs./hr. and a one way check valve 70 is contained by a passage 72 which connects conduit or suction manifold 44 with a conduit or discharge manifold 74 leading to outlet port 67. Passages 76 and 78 are arranged in a parallel flow relationship and connect suction manifold 44 with a bore 80 having an annular shaped valve member 82 with annular recesses 84 and 86 formed therein between a plurality of lands 88, 90 and 92. The valve member 82 is slidably contained in bore 80. Gear type fluid pumps 94 and 96 having approximate capacities of 16,000 lbs./hr. and 24,000 lbs./hr. respectively are disposed in passages 76 and 78 respectively. The passages 76 and 78 are arranged to communicate with conduit 44 and/or conduit 74 depending upon the position of valve member 82, which member is positioned as a function of an engine operating condition as will be hereinafter described. With the valve member in position as shown passage 76 is communicated with conduit or discharge manifold 74 by way of annular recess 84, a passage 98, and a one way check valve 100 located at the discharge end of passage 98 and with conduit or suction manifold 44 by way of annular recess 84 and branch passage 102. Valve lands 88 and 90 control the effective area of passages 102 and 98, respectively. With the valve member 82 in position as shown, passage 78 is communicated with conduit or suction manifold 44 only by way of annular recess 86 and branch passage 104, although during certain periods of engine operation passage 78 may also communicate with conduit or discharge manifold 74 through annular recess 86, a passage 106, and a one way check valve 108 located at the discharge end of passage 106.

The effective areas of passages 104 and 106 are controlled by lands 90 and 92, respectively, as shown in FIGURE 2. The variable volume chambers 110 and 112 are partially defined by valve member 82 and are disposed at opposite ends of bore 80. The action of valve member 82 is made relatively slow compared to that of the by-pass valve 52 through the use of a restriction 114 secured in an axial bore 116 formed in valve member 82 between variable volume chambers 110 and 112. A spring 118 in variable volume chamber 112 is interposed between the end wall of bore 80 and valve member 82. A passage 120 communicates discharge manifold 74 with variable volume chamber 110 and another passage 122 communicates variable volume chamber 112 with a bore 124 which slidably contains a valve 126 having a diaphragm 128 securely attached at its lower end. The diaphragm 128 is secured at its outer edge to casing 65 to provide variable volume chambers 130 and 132 which are oppositely disposed. A spring 134 is interposed between casing 62 and valve 126 to control the operation of valve 126 such that an excess of fuel is delivered to chamber 35 during engine operation. This excess of fuel flow is, for example, in the region of 2,000 lbs./hr. and is provided for by varying the force of spring 134 as desired. A passage 136 extends axially through valve 126 and communicates variable volume chamber 132 with a variable volume chamber 138 at the opposite end of valve 126. An annular recess 140 formed in bore 124 is arranged to communicate with passage 122 through an annular recess 142 formed in valve 126. A land 144 formed on the upper end of valve 126 is arranged to register with annular recess 140 to control the flow of fluid between annular recess 140 which is connected to conduit 42 by a passage 146 and annular recess 142 according to the position of valve 126. A passage 148 communicates variable volume chamber 132 with the throat of a venturi 150 disposed in conduit 42 and another passage 152 communicates variable volume chamber 130 with conduit 42 upstream of the venturi 146.

*Operation*

The position of the movable components illustrated in FIGURE 2 may be considered as corresponding to that taken by said components during operation of the engine at some intermediate speed in its speed range, at which speed the engine fuel demands are somewhat below the maximum capacity of the fuel pressurizing unit.

Assuming the engine to be shut down, a static fuel flow condition will exist throughout the fuel system. The fluid pressure in bore 80 at opposite ends of valve 82 will be equalized and spring 118 will displace valve 82 toward the left thus communicating passage 102 with passage 76 through annular recess 84 and passage 104 with passage 78 through annular recess 86. Lands 90 and 92 register with passages 98 and 106, respectively, to disestablish communication between the passages and their respective annular recesses 84 and 86. Since a flow of fluid does not exist through venturi 150, a fluid pressure drop will not exist across diaphragm 128 and valve 126 will be displaced upward by spring 134. The land 144 will shift upward to uncover annular recess 140 thereby establishing a maximum area for communication between passage 122 and conduit 42 via annular recess 142, recess 140 and passage 146. The main fuel control by-pass valve 52 will be displaced to a closed position by the action of spring 56 thus shutting conduit 42 off from chamber 35.

In starting, the engine is rotated to a normal starting speed by means of conventional cranking means, not shown. During this period, the engine driven boost pump 66 functions to deliver fuel from the fuel supply source, not shown, to the inlet of each of the engine driven gear type pumps 68, 94 and 96, which, in turn, discharge pressurized fuel from their respective outlets. The pump 68 discharges through passage 72 and check valve 70 to discharge manifold 74 from which the fuel flows through conduit 13 to conduit 14, thence to the by-pass inlet 34 and afterburner fuel control 16 inlet. Since the afterburner fuel control is inoperative at this time, the total flow of fuel through conduit 14 is directed to inlet 32. Fuel also flows from conduit 74 through passage 120 to variable volume chamber 110, thence through restriction 114 and axial bore 116 to variable volume chamber 112 at pressure $P_s$ from which it flows to conduit 42 by way of passage 122, annular recesses 142 and 140, and passage 146. The $P_1$—$P_s$ pressure differential thus established across valve 82 causes the valve to be displaced against spring 118 such that land 88 causes a decrease in the effective area of passage 102, land 90 causes an increase in the effective area of passage 98 and a dcerase in the effective area of passage 104, and land 92 causes an increase in the effective area of passage 106. Fuel pumps 94 and 96 subsequently discharge through annular recess 84, passage 98 and check valve 100 and through annular recess 86, passage 106, and check valve 108, respectively, to conduit 74 where the fuel flow will agument the flow of fuel already existing through conduits 13 and 14 to inlet 34. The fuel at pressure $P_1$ is received in chamber 35 from which it flows through passage 46 to the metering valve restriction 31, where it is regulated according to the engine fuel flow requirement and discharged to conduit 15, see FIGURE 1. Assuming a flow of fuel to chamber 35 in excess of engine requirements, the by-pass valve responds to the $P_1$–$P_4$ drop across the by-pass valve diaphragm 54 and opens to permit the excess fuel to flow to suction manifold 44 by way of by-pass ports 36 and 38, chamber 40, conduit 42 and venturi 150. The venturi 150 will function in a conventional manner and produce a fluid pressure signal which is a function of the mass rate of flow therethrough. The fluid pressure $P_v$ upstream of the venturi is transmitted through passage 152 to variable volume chamber 130 and the venturi throat pressure $P_v'$ is transmitted through passage 148 to variable volume chamber 132. Fuel at pressure $P_v'$ is transmitted through passage 136 to the variable volume chamber 138 where it acts against valve 126 on an area effectively equal to that existing at the opposite end of the valve. The $P_v$—$P_v'$ pressure differential occurring across diaphragm 128 acts to displace valve 126 downwardly against the force of spring 134. As valve 126 moves in a downward direction, the effective area of annular recess 140 is decreased and a lesser flow of fuel is permitted therethrough. The fluid pressure $P_s$ in variable volume chamber 112 will subsequently increase thus causing a decrease in the $P_1$—$P_s$ pressure differential across valve 82. Pressure $P_s$ will continue to increase until it reaches a value which, in combination with the force of spring 118, is sufficient to stabilize valve 82 against the opposing $P_1$ pressure.

At this point, valve 82 will have shifted to a position whereby land 92 has disestablished communication between passage 106 and annular recess 86, land 90 has established full communication between passage 104 and annular recess 86 as well as partially restricting communication between passage 98 and annular recess 84, and land 88 has established communication between passage 102 and annular recess 84. All of the discharge from pump 96 will be shunted through annular recess 86 and passage 104 to suction manifold 44 and a portion of the discharge of pump 94 will be shunted through annular recess 84 and passage 102 to suction manifold 44, thus unloading the pumps to the extent not needed and reducing the amount of engine power required for their operation. The remaining portion of the discharge from pump 94 is delivered through annular recess 84 and passage 98 to discharge manifold 74 such that, when combined with the discharge from pump 68, the supply of fuel to the by-pass inlet 34 will be sufficient to meet existing engine fuel flow requirements. Since pump 96 is not discharging into passage 106, the check valve 108 is maintained closed.

Upon completion of the starting of the engine, subsequent operation will proceed as requested by the operator with the by-pass valve 52 operating to maintain a constant $P_1$–$P_4$ pressure differential across the main metering valve 32. Since the operation of the fuel pumps and associated valve structure is essentially the same over the speed range of the engine, the description of the starting procedure is deemed sufficient to show the cooperating action of the components of the device. The amount of fuel being by-passed through conduit 42 and venturi 150 at any given engine speed will be an indication of the amount of fuel being delivered by the fuel pumps in relation to the amount needed to meet existing engine fuel requirements. The venturi 150 will sense the mass rate of fuel flow through conduit 42 and, depending upon the need for more or less fuel flow to chamber 35, will cause an actuation of valve 126 such that valve member 82 is acted upon by a subsequent change in pressure $P_s$ to cause additional fuel pumps to be cut into or out of the circuit as heretofore described. At no time during engine operation will the fluid pumps 68, 94 and/or 96 be required to operate against a fluid head substantially in excess of that required to maintain the correct rate of fuel flow for the main fuel control and the afterburner fuel control according to engine fuel requirements in addition to the aforementioned 2,000 lbs./hr. excess as provided for by spring 134.

If, at any given speed, one or more of the fuel pumps 68, 94 or 96 should fail for any reason, the valve 82 will be caused to function such that any remaining operable fuel pumps are introduced regardless of the order of pump failure. Since the pressure $P_1$ would be adversely affected by a pump failure, the by-pass valve 52 would function to decrease the by-pass flow through conduit 42 in an attempt to establish the required constant $P_1$–$P_4$ pressure differential. The venturi 150 would subsequently sense the action of by-pass valve 52 and transmit a pressure signal which in turn acts in the above mentioned manner to vary pressure $P_s$ in bore 80. Since valve 82 is directly affected by pressure $P_s$, it will move to introduce any of the remaining operable fuel pumps in an attempt to meet the engine fuel requirements.

Engine operation may be such that the main fuel system requirements, during normal engine operation and during normal operation of the fuel control apparatus will require only the capacity of fuel pump 68, and the additional capacity of pumps 94 and 96 will be required only during operation of the afterburner or afterburner at ram conditions, respectively. In the event of afterburner operation, which afterburner is preferably of the type disclosed and claimed in copending application Serial No. 520,722 filed July 8, 1955, in the name of Howard J. Williams and assigned to the present assignee, it will be noted that the additional request for fuel will produce a drop in pressure $P_1$ in conduit 14. The drop in pressure $P_1$ will cause a repositioning of by-pass valve 52 such as to maintain the aforementioned constant $P_1$–$P_4$ drop across metering valve 32 in the main fuel system and the aforementioned sequence of operation will occur with additional pumping elements being introduced as necessary.

In the foregoing description, a single embodiment of the invention has been described in detail. It is to be understood that this detailed description has been given for purposes of explanation only, and that the invention may be practical in many modified forms, and many changes may be made without departing from the spirit of the invention.

I claim:

1. The combination with a fuel control system for a combustion engine having a burner; a conduit for supplying fuel to the burner; a restriction in the conduit for controlling the fuel flow to the burner; valve means for varying the effective flow area of said restriction; and a by-pass valve operative with said conduit for maintaining a constant pressure drop across said restriction; of means for supplying pressurized fuel to said conduit comprising a conduit having an inlet connected to a source of fuel and an outlet connected to said first named conduit; a plurality of passages in parallel flow relationship in said second named conduit; fuel pumping means disposed in each of said passages; a separate fuel by-pass passage communicating each of said plurality of passages with said inlet; and a multi-land valve member in series with said plurality of passages and said fuel by-pass passages associated therewith for controlling the fuel flow therethrough; said valve member having a separate land associated with each of said fuel by-pass passages and being operative to vary the effective flow area of said fuel by-pass passages in a predetermined sequential order to thereby render one or more of the fuel pumping means ineffective; a conduit connected between said by-pass valve and said inlet for returning to said inlet fuel in excess of that required to maintain said constant pressure drop; and means disposed in said third named conduit and responsive to the flow of fuel therethrough, said last named means having an operative connection with said valve member and being arranged to actuate the same as a function of the rate of fuel flow through said third named conduit.

2. A fluid fuel supply system for a combustion engine, comprising a conduit for supplying fuel from a source to said combustion engine; a plurality of passages in said conduit in series flow therewith; fluid pumping means having a suction side and a discharge side in each of said passages; a fluid connection between said suction side and said discharge side, said fluid connection including a bore; valve means slidably arranged in said bore and responsive to a differential between pressures at opposite ends of said bore, said valve means being operable over a certain range of positions to simultaneously vary the effective flow area of one of said passages and said fluid connection associated therewith; said valve means being operable over a different range of positions to effect similar control over a different passage and its associated fluid connection and means operably connected to said bore for varying said pressure differential as a function of an engine operating condition to render said fluid pumping means partially or totally ineffective.

3. In a fluid fuel supply system as claimed in claim 1 wherein said fluid pumping means are positive displacement pumps.

4. In a fluid fuel supply system as claimed in claim 1 wherein each of said fluid pumping means are of a different pumping capacity.

5. The combination with a fuel control system for a combustion engine having a burner, a supply conduit for supplying fuel to the burner, a restriction in the conduit, a valve member for controlling the effective area of said restriction and a fuel by-pass valve for regulating the pressure differential across said restriction, of fuel pressurizing means comprising a casing having an inlet port connected to a suction manifold and an outlet port connected to a discharge manifold; boost pump means for supplying fuel from a source to said inlet port; a conduit connected to said outlet port and said supply conduit; a fuel by-pass conduit having a fluid connection with said fuel by-pass valve and said suction manifold; a first passage connected between said suction manifold and said discharge manifold; a low capacity fuel pump disposed in said first passage; a second passage and a third passage in parallel flow relationship with said first passage; branch passages connecting said second and third passages with said suction manifold; an intermediate capacity fuel pump in said second passage upstream from said branch passage; a high capacity fuel pump in said third passage upstream from said branch passages; a bore having fluid connections with said branch passages and said second and third passages; valve means slidably contained in said bore and arranged to control the effective flow area of said fluid connection to said branch passages and said second and third passages; a fourth passage connecting said discharge manifold with said bore at one end of said valve means; a restricted passage in said valve means for transmitting fluid from said one end of said valve means to the opposite end thereof; a drain conduit connected between said bore at the opposite end of said valve means and a source of relatively low fluid pressure; valvular means disposed in said drain conduit for controlling the fluid flow therethrough; a pressure responsive member operatively connected to said valvular means; a venturi disposed in said fuel by-pass conduit; fluid transmitting means for conveying a fluid pressure differential which varies as a function of the mass rate of flow through said fuel by-pass conduit from said venturi to said pressure responsive member; said pressure responsive member coacting with said valvular means to cause a variation in the pressure differential between opposite ends of said valve means whereupon said valve means is biased to cause a corresponding change in the flow of fuel through said branch passages and said second and third passages, said low capacity fuel pump being arranged to supply its total discharge to said discharge manifold at all times.

References Cited in the file of this patent

UNITED STATES PATENTS

| | | |
|---|---|---|
| 2,404,428 | Bradbury | July 23, 1946 |
| 2,422,808 | Stokes | June 24, 1947 |
| 2,440,371 | Holley | Apr. 27, 1948 |
| 2,545,856 | Orr | Mar. 20, 1951 |
| 2,617,361 | Neal | Nov. 11, 1952 |
| 2,738,003 | Carey | Mar. 13, 1956 |
| 2,766,580 | Buerer et al. | Oct. 16, 1956 |
| 2,835,323 | Booth | May 20, 1958 |